(12) United States Patent
Prystupa et al.

(10) Patent No.: US 11,781,977 B2
(45) Date of Patent: Oct. 10, 2023

(54) AMPLIFIED MULTIPLEX ABSORPTION SPECTROSCOPY

(71) Applicant: 12535505 Canada Ltd., Winnipeg (CA)

(72) Inventors: David Allan Prystupa, Pinawa (CA); John Stephen Pacak, Winnipeg (CA)

(73) Assignee: 12535505 Canada Ltd., Winnipeg (CA)

( * ) Notice: Subject to any disclaimer, the term of this patent is extended or adjusted under 35 U.S.C. 154(b) by 0 days.

(21) Appl. No.: 17/535,225

(22) Filed: Nov. 24, 2021

(65) Prior Publication Data

US 2022/0170848 A1 Jun. 2, 2022

Related U.S. Application Data

(60) Provisional application No. 63/120,318, filed on Dec. 2, 2020.

(51) Int. Cl.
*G01N 21/31* (2006.01)
*G01J 3/02* (2006.01)
*G01J 3/433* (2006.01)
*G01N 1/06* (2006.01)

(52) U.S. Cl.
CPC ........ *G01N 21/3103* (2013.01); *G01J 3/0205* (2013.01); *G01J 3/433* (2013.01); *G01N 1/06* (2013.01)

(58) Field of Classification Search
None
See application file for complete search history.

(56) References Cited

U.S. PATENT DOCUMENTS

| | | | | |
|---|---|---|---|---|
| 8,345,254 B2* | 1/2013 | Prystupa | ............... | G01N 21/552 356/432 |
| 9,554,738 B1 | 1/2017 | Gulati et al. | | |
| 2002/0185603 A1* | 12/2002 | Daly | ..................... | G01N 21/031 356/246 |
| 2006/0227327 A1* | 10/2006 | McNeal | ............... | G01N 21/031 356/440 |
| 2015/0277438 A1* | 10/2015 | Chen | ......................... | G06N 3/02 706/21 |
| 2017/0138851 A1* | 5/2017 | Ashrafi | ................ | G01N 33/487 |
| 2017/0156646 A1 | 6/2017 | Gulati et al. | | |
| 2018/0340893 A1* | 11/2018 | Prystupa | .................. | G01J 3/021 |

* cited by examiner

*Primary Examiner* — Tarifur R Chowdhury
*Assistant Examiner* — Roberto Fabian, Jr.
(74) *Attorney, Agent, or Firm* — Adrian D. Battison; Ade & Company Inc.; Ryan W. Dupuis

(57) ABSTRACT

An optically thin sample of a sample material is analyzed by propagating probe electromagnetic radiation from a beam source along a plurality of different ray paths, directing each ray so that each ray path intersects upon the sample at a plurality of different locations where the rays interact with the sample material to cause a modification of the ray. The rays received at each of a plurality of detection spatial region are measured separately and the measurements analyzed to provide information about at least one property of the sample material at each interaction location. An analysis is carried out to trace the path of probe radiation from a location at the probe beam source to the detection spatial region on the detection surface so as to identify the interaction locations so as to provide information about the presence of target material at each interaction location.

33 Claims, 7 Drawing Sheets

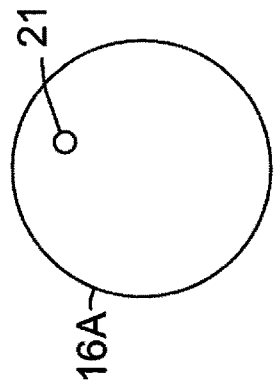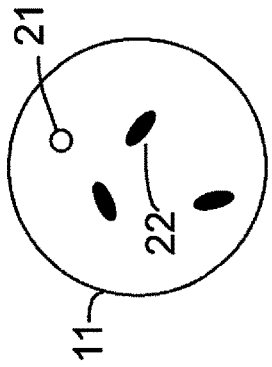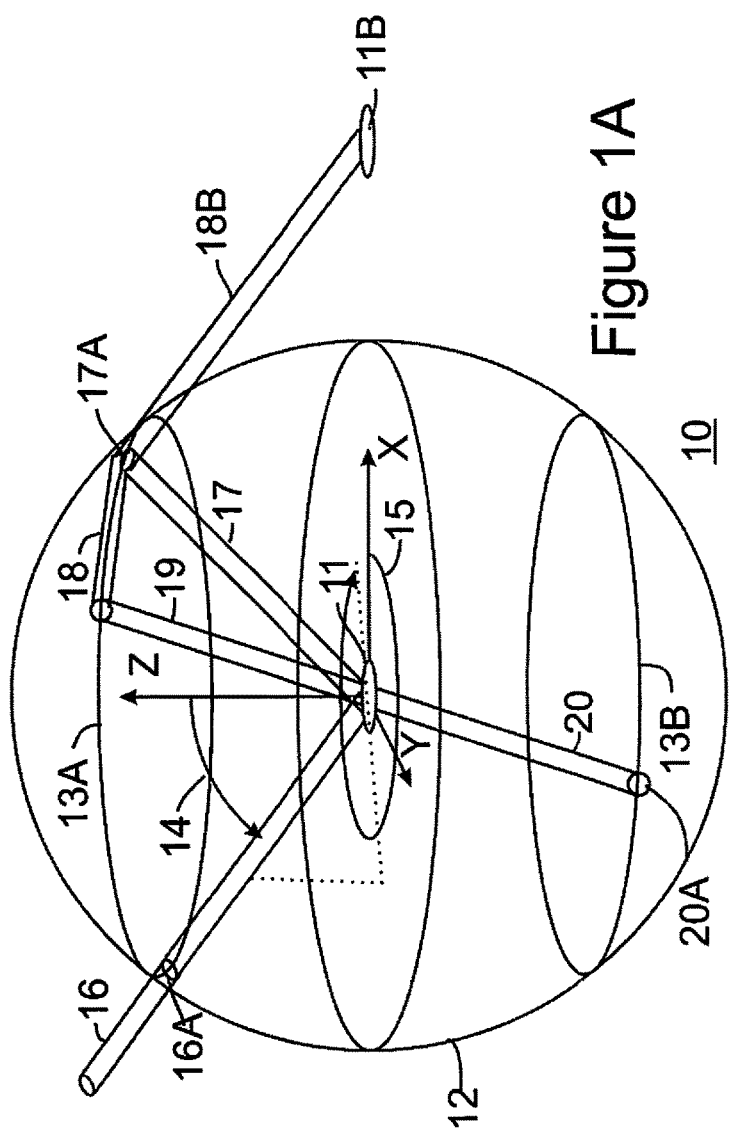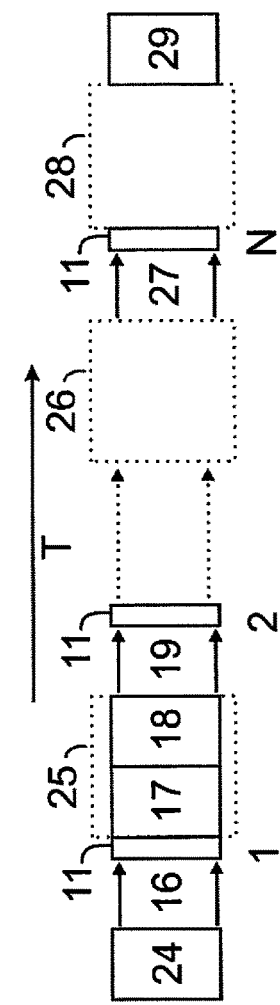

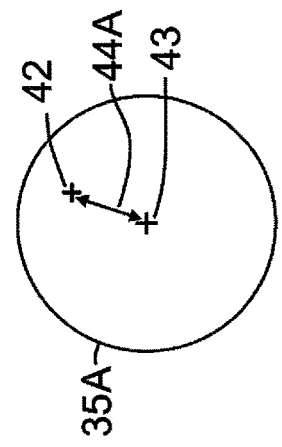
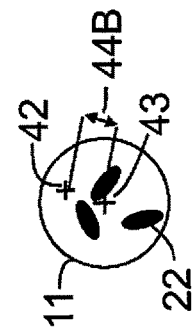
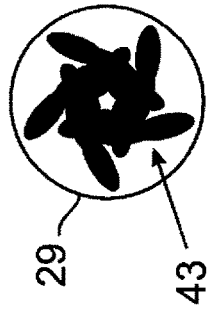
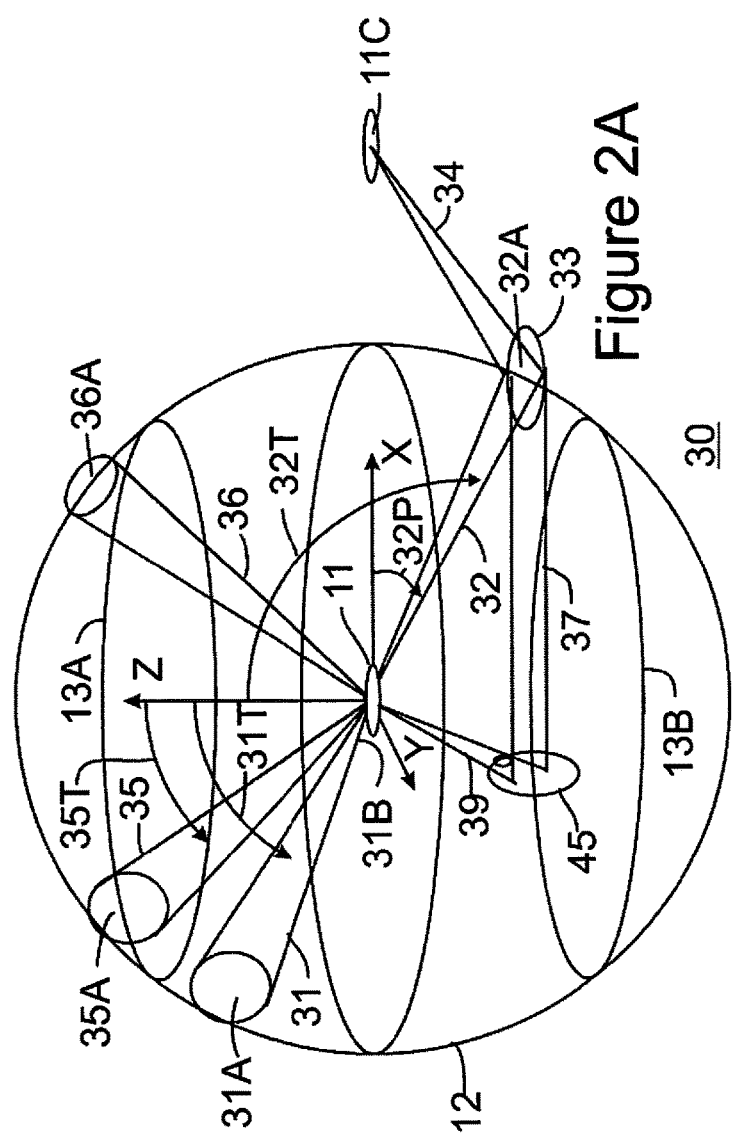
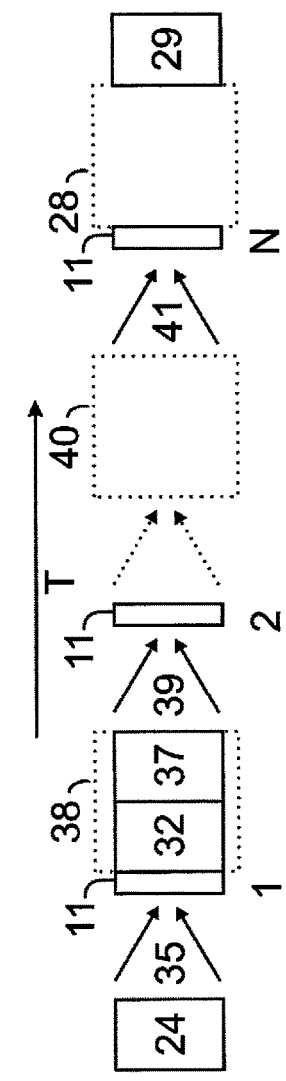

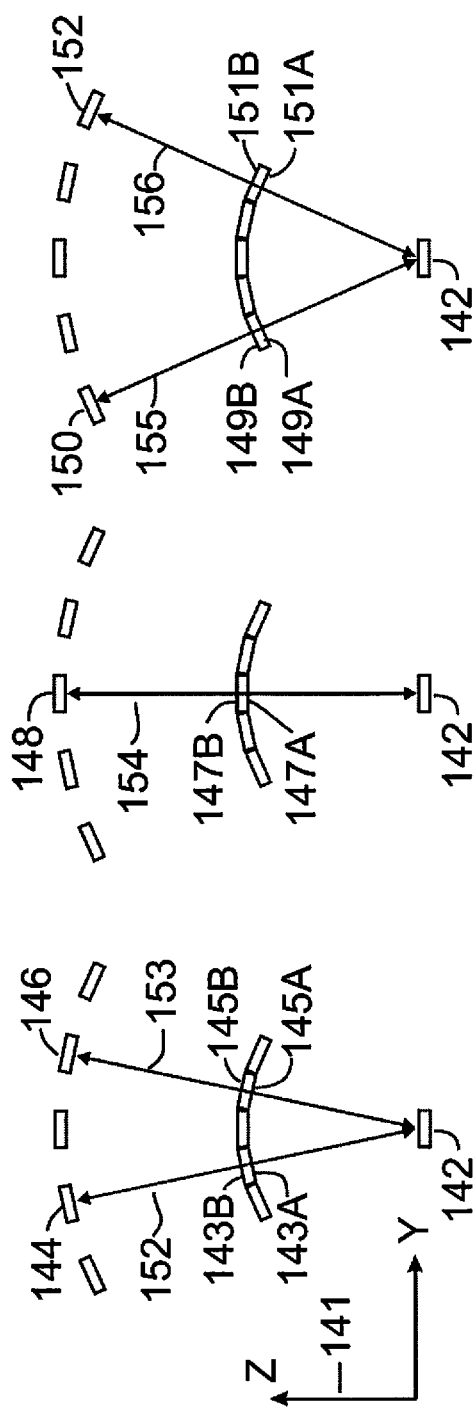

AMPLIFIED MULTIPLEX ABSORPTION SPECTROSCOPY

This application claims the benefit under 35 USC 119 (e) of Provisional application 63/120,318 filed Dec. 2 2020.

RELATED APPLICATIONS

This disclosure is related to Multiple Pass Imaging Spectroscopy; U.S. Pat. No. 8,345,254 issued Jan. 1, 2013 by the present inventors hereafter referred to as the MPIS patent.

This disclosure is related to High Efficiency Multiplexing; U.S. Pat. No. 10,585,044 issued Mar. 10, 2020 by the present inventors hereafter referred to as the HEMS patent.

This disclosure is related to Multi-dimensional Spectroscopy; U.S. provisional 63/059,298 filed Jul. 31, 2020 by the current inventors and hereafter referred to as the MDS patent and now filed on Jul. 28 2021 as PCT/CA2021/051057.

The disclosures of each of the above cited patent application documents is incorporated herein by reference.

This invention relates generally to a multiplex spectroscopy system for optically thin samples. The methods described herein may be used for measuring spectral properties of optically thin samples in general and biological samples in particular.

BACKGROUND INFORMATION

The invention relates to spectral measurements of optically thin samples in general and biological samples in particular. Biological agents such as bacteria and viruses may be detected and identified to genus, species or strain level using spectroscopic methods. However, the existing methods require relatively large sample sizes on the order of micrograms to provide spectra of sufficient quality for identification of biological agents. Samples are conventionally prepared by culturing an isolate to the required mass, typically taking 24-72 hours. Conventional methods are further limited by inability to handle samples with several species present. These shortcomings are partially overcome in the above cited MPIS patent. The MPIS patent describes a multi-pass arrangement that preserves spatial information with fixed amplification. In the above cited MPIS arrangement, collimated beams of probe radiation are directed incident upon a plurality of sample locations and the amplitude of each beam is measured by a detector. The spatial information is recovered via a linear transform. The optical amplification due to multiple passes enables spectra of a single bacteria or virus to be measured obviating the need for a culturing step. The spatial information enables the spectra of different species in the same sample to be separated and identified separately. The HEMS patent describes a multiplex method for measuring spectral flux wherein all of the spectral flux is modulated along a plurality of paths and the flux along each path is measured. The signal-to-noise ratio (SNR) is improved because all of the flux is measured and serial correlation between spectral bands is removed.

SUMMARY OF THE INVENTION

The present invention may provide one or more of the following features:

A first objective of the present disclosure is to further improve the signal-to-noise ratio (SNR) of the above cited MPIS arrangement by reducing correlation between signals from adjacent sample locations.

A second objective of the present disclosure is to provide an amplified imaging method that includes magnification.

A third objective of the present disclosure is to provide an amplified imaging method with variable amplification.

According to the invention there is provided a method for analyzing an optically thin sample for presence of a target material comprising:

locating the optically thin sample which potentially contains the target material;

the sample including a plurality of sample locations each containing an unknown sample material, a known sample material, or no sample;

propagating a beam of probe electromagnetic radiation from a beam source so that rays within the beam are directed along a plurality of different ray paths;

directing each ray using optical elements so that each ray path intersects upon the sample a plurality of times at a plurality of different intersection locations;

at each of the plurality of interaction locations causing the rays to interact with the sample material to cause a modification of the ray;

after intersecting sample locations directing each ray path to intersect a detection surface where the detection surface is divided into a plurality of detection spatial regions;

measuring separately the rays received at each detection spatial region where the measurements contain information about the interaction of sample materials along the ray paths at each interaction location;

and analyzing the measurements to provide information about at least one property of sample material at each interaction location;

wherein an analysis is carried out to trace the path of probe radiation from a location at the probe beam source to said detection spatial region on the detection surface so as to identify the interaction locations so as to provide information about the presence of said target material at each interaction location.

Thus the analysis solves the inverse problem of relating the amplitudes measured at points on the detector surface to amplitude changes at the identified interaction locations.

The inverse problem can be solved by modeling the sample point amplitudes as a linear combination of detector point amplitudes with coefficients to be determined where a first trial set of coefficients is generated by a ray trace simulation and varied iteratively to minimize the difference between the ray trace simulation and the measured detector point amplitudes. That is the solution uses modeling of detector point amplitudes as a linear combination of sample point amplitude changes. The term "ray" herein is a mathematical abstraction used in the art of geometric optics to describe a photon or packet of photons with a common Poynting vector. The invention is described using the terminology of geometric optics for simplicity in the description of key concepts of the invention. The geometric optics approximation is valid in most practical cases where the sizes of the optical components are much larger than the wavelength of electromagnetic radiation used. The geometric optics description is not limiting as the formulations specified herein may be modified in a straightforward manner to use a physical optics description accounting for diffraction effects.

The inverse problem can be solved by a neural network which is trained to model the relationships between sample regions and detector outputs.

The inverse problem can be solved by defining a set of sample regions and a set of detector regions and to bin all rays that fall within the respective regions together which leads to a set of linear equations that can be solved to provide an inverse transformation.

Preferably at least one of the sample locations has a shape different from a respective one of the detection locations.

Preferably at least one of the sample locations is defined by at least one curvilinear line.

Preferably at least one of the sample locations is defined by user selection.

In one embodiment the ray tracing is used to generate a different sequence of rays crossing each sample location.

In one embodiment the flux of rays or number of crossings at a sample location can be dynamically adjusted according to a property of the sample location.

In one embodiment at least one ray crosses a pseudo random sequence of sample locations.

In one embodiment multiple beams cross different sequences of sample locations so that there is at least one different location in any two sequences.

In one embodiment the optical layout changes dynamically to provide different sequences of sample location crossings.

In one embodiment the dynamic optical layout provides a spatial encoder.

In one embodiment at least one beam source further includes a spatial modulator.

Preferably the rays are directed by the optical components so as to intersect at least one of the sample locations at a plurality of different angles of incidence.

In one embodiment at least one of the sample locations is discontinuous or includes a plurality of different spots.

In one embodiment optical elements are dynamically aligned such that the position of a laser beam on a detector reflected off a surface of the optical element corresponds with a desired location within a threshold value.

In one embodiment the number of times a ray crosses sample locations is varied to provide variable amplification.

In one embodiment the optical elements have a plurality of different configurations where each configuration of optical elements has a corresponding set of ray paths.

In one embodiment the ray tracing is carried out by a ray tracing model where the probe beam is modeled as a set of rays that statistically reflect the properties of the probe radiation beam and where each ray has an origin location on the radiation source output port and each ray is propagated through the optical system to the intersection with the detector surface and each point of intersection with sample material or an optical element is stored.

In one embodiment the ray tracing is carried out by modeling the flow of energy of energy by Maxwell's Equations and the direction of each ray at a location corresponds to the direction of the Poynting vector at that location.

In one embodiment sample materials are positioned on a reflective plane surface and a plurality of reflective surfaces are arranged above the plane of sample materials to reflect at least one beam of probe radiation which is incident upon, and interacts with the sample materials a plurality of times.

In one embodiment the sample materials are positioned on a transparent substrate and a plurality of reflective surfaces are arranged above and below the plane of sample materials reflect at least one beam of probe radiation incident upon and interacts with the sample materials a plurality of times.

In one embodiment at least a portion of a non-collimated beam of probe radiation is incident on the same sample area plurality of times at the same average angle of incidence interacting with at least one sample region a plurality of times and the spatial distribution of amplitudes in the probe beam after said interaction is analyzed to provide information about the spatial distribution of interactions with the sample material.

In one embodiment the set of sample areas included in at least one probe radiation path is changed at least in part based on a measured sample parameter.

Thus there is provided an optical arrangement and method for multiplexing the interaction of electromagnetic radiation with optically thin heterogeneous sample materials. A beam of probe electromagnetic radiation is emitted by a radiation source and rays within the beam are directed by optical elements along a plurality of different ray paths wherein each ray path includes m sample locations wherein m is an integer greater than or equal to two. The optical elements may have a plurality of different configurations in the reference frame of the sample locations. That is each configuration of optical elements has a corresponding set of ray paths. The ray paths are chosen such that the set of ray paths intersecting sample locations and terminating at measurement locations forms an invertible set of relationships between sample locations and measured amplitudes. Different rays may have different values of m and different wavelength, phase, polarization and amplitude. The sample locations may contain an unknown sample material, a known sample material, or no sample. A ray path may be arranged by the optical elements to be incident upon the same sample location more than once. At each sample location the rays interact with a material and at least one property of the ray (wavelength, amplitude, polarization, or phase) is changed. After intersecting m sample locations, the ray paths intersect a detection surface. The detection surface is divided into a plurality of spatial regions and one or more properties (wavelength, amplitude, polarization, or phase) of the flux of rays intersecting each spatial region are measured with a measurement means. The measurements contain information about the interaction of sample materials along ray paths intersecting each measurement region. The measurements are analyzed to provide information about at least one property of sample material at each sample location.

In accordance with an important feature of the invention there is provided a radiation source. The radiation source provides an output beam of probe electromagnetic radiation with defined properties at one or more output ports. The output beam properties include the spectral distribution of wavelengths, and spatial distribution of phase, polarization, amplitude and direction associated with each wavelength. The properties of each output beam of electromagnetic radiation may vary temporally. The radiation source includes all optical elements required to produce the output beam with the above noted defined properties. For example, the radiation source may include an interferometer that modulates the phase of each output wavelength. For example, the radiation source may include an optical element that spatially or temporally separates different wavelengths. For example, the radiation source may include a spatial modulator that changes the spatial distribution of amplitude in the output beam. The radiation source may for example be a laser together with beam shaping optical elements. The radiation source may for example be a light emitting device together with beam shaping optical elements. The radiation source may for example be a black body emitter together with beam shaping optical elements. The radiation source may include filters that limit the range of wavelengths in the beam.

The invention can be understood as a sequence of geometric transformations on a beam of probe radiation by optical elements wherein the geometric transformations direct probe radiation to interact with sample material a plurality of times. The geometric transformations are rotation, translation, inversion, reflection, scaling and any combination thereof. The geometric transformations are reversed mathematically to provide information about the sample interactions. For example, the output beam of probe radiation may be a polychromatic beam with uniform intensity. The projection of the output beam on a detection surface has uniform intensity and is analogous to a blank sheet of paper. The probe radiation beam is projected onto, and interacts with sample material to produce an image of sample interactions a plurality of times. Each projection of the probe beam onto sample material produces a different image. The probe beam image at the detector surface after a plurality of sample interactions is the superposition of all sample interactions. For example, if the sample interaction is absorption then the absorbance at each sample point is recorded at the corresponding point in the transformed probe beam.

The relationship between amplitudes at sample material locations and detector surface locations can be determined with a ray tracing model. The rays are chosen such that each ray (or group of rays) passes through a different set of sample locations and hence carries information about a unique set of sample locations. Preferably the sequence of sample locations for each ray (or group or rays) is a pseudo-random sequence of sample locations as described in more detail below. Specifically, the probe beam is modeled as a set of rays that statistically reflect the properties of the probe radiation beam. Each ray has an origin location on the radiation source output port, a direction, wavelength, polarization and phase. The polarization vector carries amplitude information. Each ray is propagated through the optical system to the intersection with the detector surface. Each point of intersection with sample material or an optical element is stored. The propagation of radiation may be modeled based on the properties of ideal optical elements. Preferably the properties used to model the optical elements are measured to account for the effects of impurities in optical materials and geometric defects (scratches, variation from ideal surface, etc). There are four approaches to solving the inverse problem: that is relating the amplitudes measured at points on the detector surface to amplitudes at sample surface points.

The first approach is to model the sample point amplitudes as a linear combination of detector point amplitudes with coefficients to be determined. A first trial set of coefficients is generated and varied iteratively to minimize the difference between the ray trace simulation and the measured detector point amplitudes.

Secondly, a neural network may be trained to model the relationships between sample regions and detector outputs.

The third approach is to define a set of sample regions and a set of detector regions and to bin all rays that fall within the respective regions together. This leads to a set of linear equations that can be solved to provide an inverse transformation.

The fourth approach is to generate an approximate solution using the second or third method and then to refine the solution so generated by the first method.

In accordance with an important feature of the invention there is provided a plurality of redirection elements operable to change the direction of probe radiation. The redirection elements may optionally change a spatial property of the probe radiation. The redirection elements are operable to direct probe radiation incident on a first sample location toward a second sample location wherein the first and second sample locations are consecutive sample locations in a sequence of sample locations on a path. The plurality of redirection elements may be arranged as an array wherein each successive redirection element in the array directs radiation to the next sample location in a sequence of sample locations. The redirection elements may for example be a single reflective surface. The redirection elements may for example be a pair of reflective surfaces. The reflective surfaces may be either internal reflection surfaces or external reflection surfaces. The reflective surfaces may be plane or may be curved. The redirection elements may be dynamically configured, to direct radiation received from a first sample location to a second sample location for a first path and from a first sample location to a third sample location for a second path. For example, the redirection elements may direct radiation from sample location n to sample location n+1 for a first path and from sample location n to sample location n+3 for a second path. The redirection elements may be reconfigured for example by translating or rotating a mirror from a first position to a second position. The redirection elements may for example be reconfigured by changing the optical properties of a surface electronically from a reflective state to transmitting state. The redirection elements may for example be reconfigured by changing the refractive index of a material along the path electronically to cause a change in refraction. The redirection elements may for example be reconfigured by changing the pitch of a diffractive element.

In accordance with an important feature of the invention there is provided a set of sample locations. Each sample location includes a device to position a sample material at least for the duration of a measurement. The sample location may include a surface that externally reflects probe radiation. The surface may be plane or curved. Preferably the reflectivity is greater than 90%. More preferably the reflectivity is greater than 99%. The reflective surface may for example be a gold mirror that has reflectivity greater than 99% for infrared probe radiation. The sample location may include a surface that reflects probe radiation internally. Preferably the internal reflection is total internal reflection and an evanescent wave from the probe radiation interacts with a sample material retained proximate to the internally reflective surface. The internally reflective surface may for example be an interior surface of a crystal composed of Si, Ge, ZnSe, diamond, KRS-5 or other material from which ATR devices may be fabricated. The sample location may include a surface that is transparent to probe radiation. The probe radiation may be transmitted through both the sample material and the transparent surface. The transparent surface may for example be KBr, NaCl, CaF2, BaF2, AgCl, CsI, Si, Ge, ZnSe, or other optical window material. The transparent surface may for example be a thin polymer film or a thin glass plate. The transparent surface may for example be a stream of gas.

In accordance with an important feature of the invention there is provided a control device operable to receive amplitude measurements for each path and to analyze the measurements to provide information about a property of a sample material at least at one sample location. The property may for example be absorbance. The property may for example be scattering. The property may for example be emission. A property of a sample material may be calculated using measured amplitudes, theoretically calculated amplitudes (from known properties), or any combination thereof.

In accordance with an important optional feature of the invention which can be used independently with any of the above or following features, there is provided a translation device operable to generate relative motion between the array of sample locations and at least one redirection element. For example, an array of redirection elements may be displaced to discrete positions relative to the array of sample locations wherein each discrete position selects a different path. The translation device may include a position measurement device. The translation device may further be linked with and controlled by the control device.

In accordance with an important optional feature of the invention which can be used independently with any of the above or following features, the control device may further be operable to select at least two different paths by configuring one or more optical elements wherein each path includes a different sequence of sample locations. For example, the control device may generate logic signals that cause a motor to rotate a mirror from a first angle that selects a first path to second angle that selects a second path.

In accordance with an important optional feature of the invention which can be used independently with any of the above or following features, there is provided an optical alignment device operable to measure at least one configuration parameter of a surface along a path. The optical alignment device may include a radiation source, a measurement device, and logic integral to the control device. For example, the optical alignment device may determine the normal to a mirror surface by directing a laser beam onto said surface and measuring the location of the reflected beam on a reference plane. The measured normal is compared with a required normal for a selected path and the mirror configuration may be adjusted until the difference between measured and required configurations is less than a threshold value.

In an important embodiment that may be used in combination with any of the preceding or following embodiments, the sample materials are positioned on a reflective plane surface and a plurality of reflective surfaces are arranged above the plane of sample materials to reflect at least one beam of probe radiation which is incident upon, and interacts with the sample materials a plurality of times. The reflective plane for example may be a metallic first surface mirror. The reflective metal surface may for example be Ag, Al, Au, Cu, Ni, or Pt.

In an important embodiment that may be used in combination with any of the preceding or following embodiments, the sample materials are positioned on a transparent substrate and a plurality of reflective surfaces are arranged above and below the plane of sample materials reflect at least one beam of probe radiation incident upon and interacts with the sample materials a plurality of times. The transparent substrate may for example be a glass, crystal, polymer film or a gas flow.

In an important embodiment that may be used in combination with any of the preceding or following embodiments, the sample materials are positioned on a sample facet of an internal reflectance element and facets of the internal reflectance element are arranged to direct at least one beam of probe radiation incident onto the sample facet, and interacts with sample materials proximate to the sample facet a plurality of times. The beam of probe radiation may for example be mid infrared radiation with wavelength between 2.5 microns and 25 microns. The internal reflectance element may for example be comprised of high refractive index materials such as Si, Ge, ZnSe and ATMIR5 CsI or AgCl. Other materials may be used.

In an important embodiment that may be used in combination with any of the preceding or following embodiments, at least a portion of a non-collimated beam of probe radiation is incident on the same sample area plurality of times at the same average angle of incidence interacting with at least one sample region a plurality of times and the spatial distribution of amplitudes in the probe beam after said interaction is analyzed to provide information about the spatial distribution of interactions with the sample material.

In an important embodiment that may be used in combination with any of the preceding or following embodiments, at least a portion of a collimated beam of probe radiation is incident on the same sample area a plurality of times at different angles of incidence and the spatial distribution of amplitudes in the probe beam after said interaction is analyzed to provide information about the spatial distribution of interactions with sample material.

In an important embodiment that may be used in combination with any of the preceding or following embodiments, at least a portion of a non-collimated beam of probe radiation is incident on the same sample area a plurality of times at different angles of incidence and the spatial distribution of amplitudes in the probe beam after said interaction is analyzed to provide information about the spatial distribution of interactions with sample material.

In an important embodiment that may be used in combination with any of the preceding or following embodiments, a sequence of M beams of probe radiation follow different paths incident on a different sub-set of sample areas selected from a set of N sample areas and the spatial distribution amplitude in each interacted probe radiation beams is analyzed to provide information about the spatial distribution of interactions with sample material in each sample area, wherein each path in the sequence is incident on a different sub-set of fewer than N sample areas and wherein at least one path in the sequence is incident on each sample area and wherein M is equal to or greater than N. Preferably the set of sample areas included in each path is based on cyclic permutations of a pseudo-random sequence. In some embodiments further at least one path in the sequence of paths is incident on the same sample area a plurality of times.

In an important embodiment that may be used in combination with any of the preceding or following embodiments, a plurality of probe radiation beams is simultaneously incident on a set of N sample areas wherein each probe radiation beam is incident on a different sub-set of fewer than N sample areas and each sample area is included in the path of at least one probe radiation beam. In some embodiments at least one probe radiation beam is incident on the same sample area from different directions or at different angles of incidence. The optical configuration is changed at least N times causing each probe radiation beam to interact with at least N different sequences of sample areas. A sequence of at least N measurements of the spatial amplitudes corresponding to the at least N different optical configurations is made for each probe radiation beam in the plurality of simultaneous probe radiation beams after interaction with sample material and the spatial amplitudes are analyzed to provide information about the spatial distribution of sample interactions.

In an important embodiment that may be used in combination with any of the preceding or following embodiments, the set of sample areas included in at least one probe radiation path is changed at least in part based on a measured sample parameter. For example, the spatial distribution of interactions with a sample material is approximated using a first set of probe radiation paths and a second set of probe radiation paths is selected to improve the signal-to-noise ratio of the first approximation. For example, the second set of probe radiation paths may be selected to increase the total radiation flux at a strongly absorbing sample region thereby improving photon counting statistics. For example, the second set of probe radiation paths may be selected to reduce the total radiation flux at a weakly absorbing sample region thereby reducing the dynamic range required by the detection means allowing greater amplification of weak signals.

In an important embodiment that may be used in combination with any of the preceding or following embodiments, an amplitude of probe radiation directed along at least one ray path is changed at least in part based on a measured sample parameter. For example, the amplitude measured following sample interactions along a first ray path may differ significantly from the amplitudes measured following sample interactions along a set of second ray paths. The control means may generate signals that cause a first set of measurements of ray path amplitudes to be made with low detector amplification and large dynamic range. The control means then selects measured ray path amplitudes that differ from the mean ray path amplitude by more than a threshold value and generates signals that cause the probe radiation source to change the initial amplitude of probe radiation directed along the selected ray paths so as to bring the amplitude of probe radiation measured along the selected paths closer to the mean. The amplitudes measured along selected paths may be scaled in subsequent numerical calculations to account for the change in initial amplitude. This rebalancing of probe radiation amplitude allows the amplification of the detector means to be adjusted to map the dynamic range of the detector onto a smaller range of measured amplitudes thereby allowing measurement of smaller amplitude differences between different ray paths. The probe radiation source may for example include an integral spatial modulator that operates to temporally either direct or not direct radiation along selected ray paths. The fraction of time probe radiation is directed along a ray path determines the average initial amplitude of probe radiation along that ray path. In another example, the spatial modulator may modulate the fraction of probe radiation transmitted at a location in response to an electrical signal.

In an important embodiment that may be used in combination with any of the preceding or following embodiments, the probe radiation beam is focused at least once between interactions with sample regions.

In an important embodiment that may be used in combination with any of the preceding or following embodiments, the path of probe radiation is traced from a location at the probe beam source to a location on the detection surface and each sample location in the traced path is related to the amplitude of the probe radiation at the detection surface. That is the amplitude at the location on the detection surface is related to the sum of interactions with sample regions included in the probe radiation path. The process is repeated for a representative sample of all paths from the probe radiation source to the detection surface. In some embodiments, the interaction with sample material is modeled along each probe radiation path with trial parameters and the trial parameters are iteratively varied to minimize the difference between measured and calculated amplitudes at the detection surface. In some embodiments, the sample areas are divided into a plurality of sample regions, the detection surface is divided into a plurality of detection regions, and the sample regions are related to detection regions by a set of linear equations that are solved to provide information about the spatial distribution of interactions with sample material. For example, the detection regions may be represented as rows of a matrix and sample regions may be represented as columns of a matrix. The amplitude (at the probe beam source) of each probe radiation path is added to each column corresponding to a sample region intersected by the probe radiation path in the row corresponding to the detection region. The resulting matrix equation may be solved by inversion as described in the above cited MPIS patent or least squares methods as described in the above cited HEMS patent. In some embodiments, the sample regions are related to detection surface regions by training a neural network with calibration data: that is a set of known sample interactions at known sample regions.

In an important embodiment that may be used in combination with any of the preceding or following embodiments, the sample material is a biological material wherein the biological material may be eukaryotic cells, prokaryotic cells, virus particles, bacteria, a tissue, a biopolymer solution, or any combination thereof.

In an important embodiment that may be used in combination with any of the preceding or following embodiments, the sample material is a gas.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

FIG. 1A shows the PRIOR ART sampling geometry of the above cited MPIS patent.

FIG. 1B shows the cross-sectional area of the probe beam of FIG. 1A at the radiation source.

FIG. 1C shows a cross-sectional view of the sample area of FIG. 1A.

FIG. 1D is a schematic view of the arrangement of FIG. 1A.

FIG. 1E shows the cross-sectional area of the probe beam of FIG. 1A at the detector.

FIG. 2A shows the sampling geometry of the according to the present invention.

FIG. 2B shows the cross-sectional area of the probe beam of FIG. 2A at the radiation source.

FIG. 2C shows a cross-sectional view of the sample area of FIG. 2A.

FIG. 2D is a schematic view of the arrangement of FIG. 2A with a single probe beam.

FIG. 2E shows the cross-sectional area of the probe beam of FIG. 2A at the detector.

FIG. 6A shows a first cross-sectional view of a beam path for multiple passes through a sample area.

FIG. 6B shows a second cross-sectional view of a beam path for multiple passes through a sample area.

FIG. 6C shows a third cross-sectional view of a beam path for multiple passes through a sample area.

DETAILED DESCRIPTION

Figure 3:
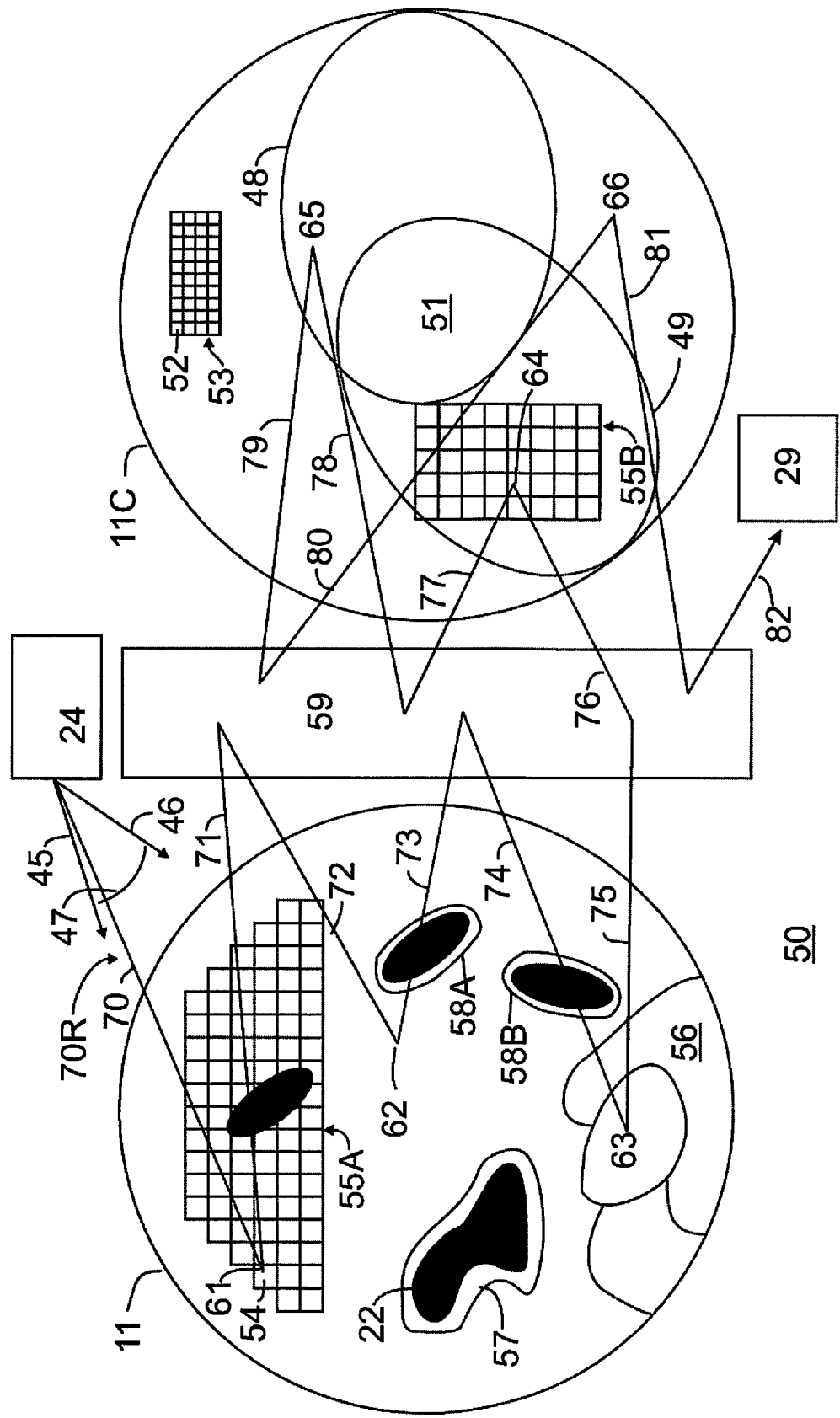
FIG. 3 schematically shows sample regions in sample areas of the arrangement according to the present invention.

Embodiments of the present disclosure are described in detail with reference to the accompanying drawings. Detailed descriptions of constructions or processes known in the art may be omitted to avoid obscuring the subject matter of the present disclosure. Further in the following description of the present disclosure, various specific definitions found in the following description are provided to give a general understanding of the present disclosure, and it is apparent to those skilled in the art that the present disclosure can be implemented without such definitions.

FIG. 1A illustrates the sampling geometry of the above cited MPIS patent generally indicated at 10. Sample region 11 is at the center of unit sphere 12. A collimated beam of probe radiation 16 passes through constant latitude line 13A and is incident on sample region 11 at constant angle of incidence theta indicated at 14. The projection of the probe beam 16 onto the xy plane makes an angle phi1 with the x-axis as indicated at 15. Probe beam 16 is comprised of parallel (or nearly parallel) ray bundles 21 distributed across cross-sectional area 16A of the beam as best seen in FIG. 1B. The ray bundles 21 are chosen to correspond with detector regions. As shown in FIG. 1C, sample region 11 is intersected by ray bundle 21 and contains regions with absorbing material 22. Probe radiation may be reflected or transmitted at sample region 11. As shown, probe radiation beam 16 is reflected as probe radiation beam 17. The cross-sectional areas of probe beam 16 indicated at 16A and the cross-sectional area of probe beam 17 as indicated at 17A are equal or nearly equal. On unit sphere 12, 16A and 17A subtend equal or nearly equal solid angles. In a first path, probe beam 17 is redirected as shown at 18 by reflective optical elements (not shown) to form probe beam 19 in the direction of sample region 11. Because the angle of incidence is constant, probe beam 19 lies on constant latitude line 13A. As shown, probe beam 19 is transmitted through sample region 11 and the transmitted beam indicated at 20 is incident on constant latitude line 13B. Constant latitude lines 13A and 13B are displaced along the z-axis by cos(theta) and −cos(theta), respectively. The cross-sectional area of probe beam 20 shown at 20A is equal or nearly equal to the cross-sectional area of probe beam 16 shown at 16A. In a second path probe beam 17 is redirected to second sample region 11B, which is related to sample region 11 by a constant translation vector. The second, and each successive sample region, has the same type of unit sphere 12 as discussed in relation to sample region 11.

As best seen in FIG. 1D, the beam path can be parameterized along coordinate T. Radiation source 24 produces collimated beam 16 incident a first time on sample region 11. A geometric transformation on the beam reflected or transmitted by the sample region 11 as indicated at 25. In the case of reflection, the transformation may include beam segments 17 and 18 as shown in FIG. 1A. The geometric transformation is performed by optical elements which may for example be one or more mirrors or total internal reflection at one or more crystal faces. It should be noted that the geometric transformation is relative to a fixed frame of reference such as the sample region. In the frame of reference of the probe beam, the displacement between any two rays is invariant. Hence, applying a sequence of geometric transformations to the sample region 11 produces the same result. Following geometric transformation 25 probe beam 19 is incident on sample region 11 a second time. The sequence of receiving an interacted beam from a sample region, performing a geometric transformation on the probe beam and directing the probe beam incident on a sample region is repeated a plurality of times. The Nth geometric transformation is shown at 26 which directs probe beam 27 onto the sample region 11. The interacted beam is transformed by optical elements at 28 and is incident on detector 29.

As best seen in FIG. 1E, the probe beam at detector 29 is a superposition of the spatial pattern of absorption at sample location 11 (as shown in FIG. 1C) with a sequence of geometric transformations. The pattern indicated at 23 at the detector 29 shows the effect of a rotation operation only. In general, the pattern at the detector 29 includes the effects of rotation, mirror reflection, inversion, and translation. In the above cited MPIS patent each detector region is mapped to a set of sample sub-regions by the geometric transformations and a matrix equation is solved to "unwind" the geometric transformations to give the sample plane image as shown in FIG. 1C. The total absorption is multiplied by the number of sample passes N, thereby improving the signal-to-noise ratio for weakly absorbing sample materials. In the case of reflectance, the probe beam must intersect either constant latitude line 13A or constant latitude line 13B, but not both, at least twice for each sample pass of sample region 11. The maximum number of sample passes is thus pi radians divided by the solid angle beam width. In the case of transmittance, the probe beam must intersect constant latitude line 13A once and constant latitude line 13B once for each sample pass of sample region 11. The maximum number of sample passes is thus 2*pi radians divided by the solid angle beam width.

FIG. 2A illustrates the sampling geometry of the present invention generally indicated at 30. Sample region 11 is at the center of unit sphere 12. Probe radiation may be incident on sample region 11 from any location on unit sphere 12: that is there is no restriction on the spherical coordinate angles theta and phi shown for beam 32 at 32T and 32P, respectively. In the above cited MPIS patent (FIG. 1A), theta is fixed and phi can be any angle. For comparison, the fixed latitudes of FIG. 1A are shown at 13A and 13B in FIG. 2A. The collimated beams indicated at 16, 17, 18, 19 and 20 (FIG. 1A) are within the scope of the present invention, but are not replicated in FIG. 2A to avoid complexity.

As shown in FIG. 2A, probe radiation beams 31 and 35 are incident on sample region 11 at different angles of incidence 31T and 35T, respectively. Probe radiation beams 31 and 35 subtend solid angles 31A and 35A on unit sphere 12. In some embodiments suitable for general survey scans solid angles 31A and 35A are equal. In some embodiments suitable for enhancing the signal from selected sub-regions of sample region 11, solid angles 31A and 35A may be different. As indicated at 31B, probe radiation beams may be convergent: that is the cross-sectional area of probe beam 31 at 31B is less than its cross-sectional area at 31A.

Probe beam 31 interacts with material in sample region 11 and is transmitted as probe beam 32, which subtends solid angle 32A on unit sphere 12. Solid angles 31A and 32A are equal only in the special cases of collimated beams or a convergent beam that converges to a point at the center of the unit sphere. These special cases correspond to magnification factor one. In general, solid angles 31A and 32A may be different. This important feature of the invention allows the magnification of the sample region to be varied. Optical element 33, which may for example be a concave mirror, a lens, or a crystal facet, redirects and refocuses probe beam 32 toward second sample region 11C as probe beam 34. In some embodiments sample region 11C is related to sample region 11 by a non-constant translation vector: that is the displacement between sample regions may vary. The intervals between sample regions may be pseudo-random in a manner analogous to the modulation regions discussed in the above cited HEMS patent. That is the probe beam is modulated by interaction with a pseudo random sequence of sample regions. In other embodiments the interval between sample regions is constant.

In an alternate arrangement, probe beam 32 is directed by optical element 33 to optical element 45 as probe beam 37 and optical element 45 re-directs probe beam 37 toward sample region 11 as probe beam 39. Hence probe beam segments 31, 32, 37 and 39 form a single probe beam that interacts with sample region 11 twice. The pattern may be repeated a plurality of times to give N sample passes. For each sample pass, the probe beam subtends an entrance solid angle and an exit solid angle. For the transmission case, the sum of entrance and exit solid angle is less than or equal to the solid angle of the unit sphere 4pi steradians. This contrasts with the above cited MPIS case in which the sum of entrance and exit solid angles is twice the solid angle of a narrow ring at constant latitude. More sample passes are possible because a greater solid angle is available. For the reflection case, the sum of entrance and exit solid angle is less than or equal to the solid angle of a hemisphere 2pi steradians. This contrasts with the above cited MPIS case in which the sum of entrance and exit solid angles the solid angle of a narrow ring at constant latitude. More sample passes are possible because a greater solid angle is available.

FIG. 2B shows a cross-sectional view of probe beam 35 at the unit sphere surface 35A. Probe beam is comprised of rays with origin 42 displaced from the beam center 43 by displacement 44A. Each ray follows the Poynting vector for each point in the probe beam cross-section. In embodiments where the sample dimensions are larger than the wavelength of the probe radiation the rays may be modeled by geometric optics methods. In some embodiments, the rays may be modeled with physical optics methods which include diffraction effects. In embodiments where the sample dimensions are similar to or less than the wavelength of probe radiation, the rays may be modeled by solving Maxwell's equations. This may be done for example with system of linear equations on a suitably fine mesh.

FIG. 2C shows a cross-sectional view of probe beam 35 at the intersection with sample area 11. The cross-sectional area is smaller due to converging rays. As shown ray 42 is displaced from beam center 43 by displacement 44B, which is less than displacement 44A. Sample material 22 absorbs a portion of the energy flux incident. In the geometric model, rays intersecting sample material 22 suffer a fixed absorbance. In the more rigorous physical models, there is a probability of absorption (absorption cross section) for rays proximate to sample material 22 that varies with polarization and distance from the center of each absorbing molecule.

FIG. 2D shows a schematic view of a single channel arrangement of the invention. Radiation source 24 produces a possibly convergent beam of probe radiation as indicated at 35 incident on sample area 11 a first time. Optical elements collectively indicated at 38 re-direct transmitted probe beam 32 into segment 37 and segment 37 is re-focused to form probe beam 39. Probe beam 39 is incident on sample area 11 a second time. The process of receiving a probe beam after interaction with the sample area, re-directing the beam, and optionally re-shaping the beam for example using focusing mirrors is performed a plurality of times until final probe beam 41 is directed incident on the sample area to interact for the Nth time. The interaction radiation is collected by optical elements 28 and directed onto detector 29.

FIG. 2E shows a schematic view of the radiation pattern on a detector 29 after multiple interactions with a sample area. Detector 29 as shown is scaled relative to sample area 11 in FIG. 2C to illustrate the magnification feature of this arrangement according to the present invention made possible by convergent probe beams. The radiation pattern 43 is analyzed to provide information about the distribution of absorbing material in sample area 11. The radiation amplitude at each point on the detector surface is related to the distribution of interacting material in the sample areas by a sequence of geometric transformations that are in all but a few special cases non-commutative.

The detector surface is sub-divided into a set of detector regions. For example, a detector region may correspond to a fixed pixel. For example, a detector region may correspond to a portion of a detection surface that is measured separately from other detector regions. The detection device may for example be the arrangement in the above cited HEMS patent.

Figure 4:
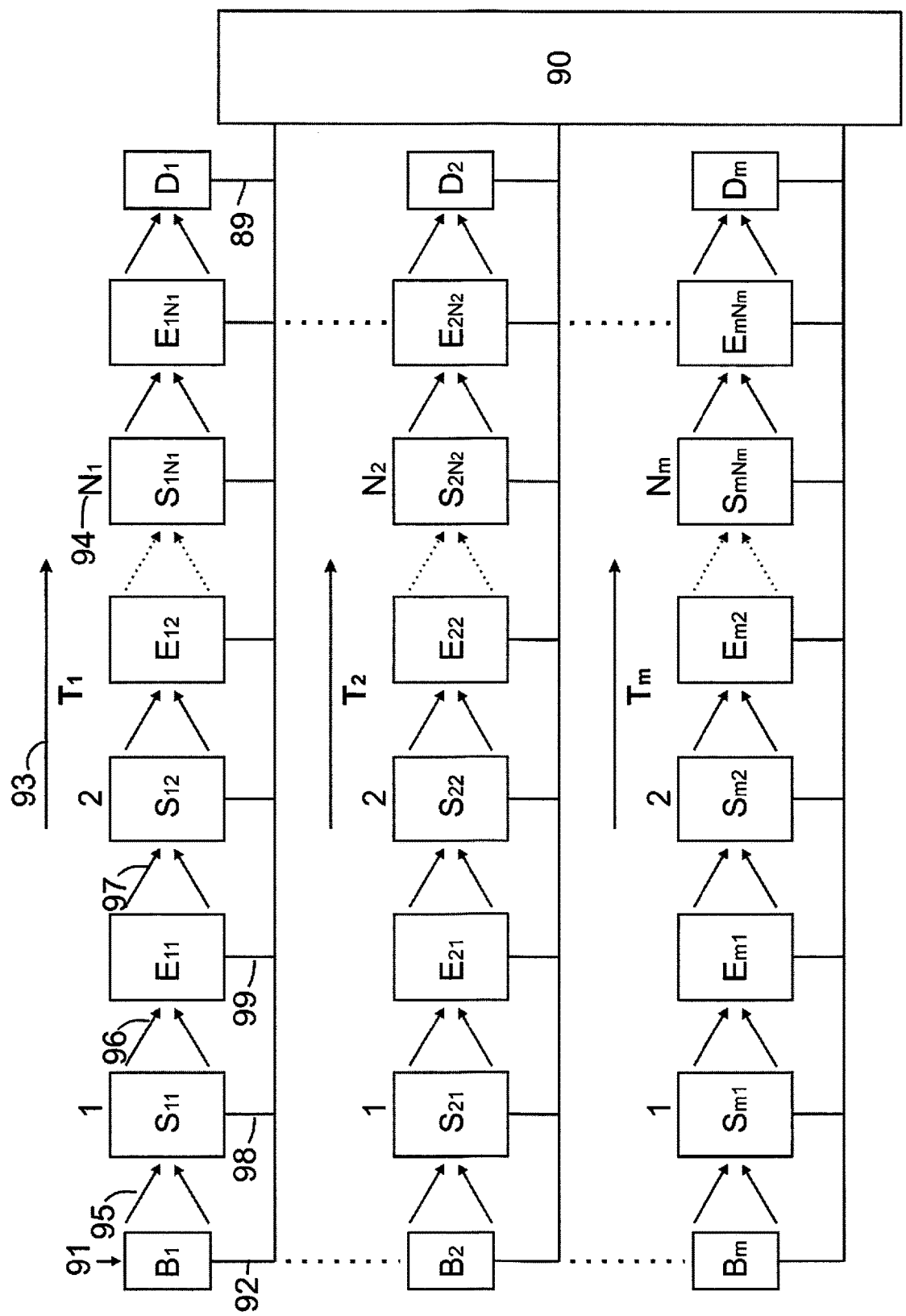
FIG. 4 shows a schematic view of the arrangement of the present invention.

FIG. 3 schematically illustrates the relationship between sample area, beam region and sample region. Two sample areas are generally indicated at 50. In general, there can be more than two sample areas as shown in FIG. 4. Radiation source 24 produces a beam of radiation 47 with edge rays 45 and 46 and sample ray 70. Sample ray 70 intersects sample area 11 in sample region 54 at point 61 where ray 70 interacts with sample material present at (geometric optics) or proximate to (physical optics) point 61. Ray 70 is reflected or transmitted as ray 71 that is redirected by optical elements 59 as ray 72 incident at point 62 where further interaction with sample material may occur. Ray 72 is reflected or transmitted as ray 73 that is redirected by optical elements 59 as ray 74 incident at point 63 where further interaction with sample material may occur. Ray 74 is reflected or transmitted as ray 75 that is redirected by optical elements 59 as ray 76 incident at point 64 where further interaction with sample material may occur. Ray 76 is reflected or transmitted as ray 77 that is redirected by optical elements 59 as ray 78 incident at point 65 where further interaction with sample material may occur. Ray 78 is reflected or transmitted as ray 79 that is redirected by optical elements 59 as ray 80 incident at point 66 where further interaction with sample material may occur. Ray 80 is reflected or transmitted as ray 81 that is redirected by optical elements 59 as ray 82 incident on detector 29. Hence ray 70R consists of ray segments 70, 71, 72, 73, 74, 75, 76, 77, 78, 79, 80, 81, and 82. The symbol T represents all segments of ray 70R collectively within the scope of this disclosure. Ray 70R interacts with sample material at points 61, 62, 63, 64, 65, and 66 and therefore the total interaction is on average six times the interaction for a single point. For absorption the absorbance is amplified by a factor of six in this example. In some embodiments the amplification factor is greater than six. In the above cited MPIS patent, the sample regions are implicitly defined by detector regions. In the present invention the sample interaction points may be assigned to any user selected sample region. The selection of sample regions by detector regions is a special case in the present invention.

As shown at 11 and 11C, beam 47 will intersect and interact with a plurality of sample areas. Example projections of beam 47 on sample area 11C termed beam areas are indicated at 48 and 49. In general there can be more than two beam projections on a sample area. The beam projections include common area 51 where sample material may interact with beam 47 twice. In general beam 47 may interact with sample material more than twice. In the MPIS patent (FIG. 1) there is a single beam that projects onto substantially all of the sample area. In the present invention, there can be multiple beams that individually project onto a portion of the sample area, but collectively project onto substantially all of the sample area. In general, the beam interacts with a separate beam area within a sample area for each intersection of the beam with a sample area. At each intersection, the beam area may include all or a portion of the sample area.

Each sample area is sub-divided into a user-defined set of sample regions. A sample region may for example have a size defined by the spatial resolution of the optical system. In some embodiments the sample area is sub-divided into sample regions on regular lattice. This is illustrated in FIG. 3 where sample region 52 corresponds to the spatial resolution of the optical system and is arranged on a regular grid 53. As shown at 54, a sample region may be larger than the spatial resolution. Any sample region less than the sample area is allowed. For example, a first sample region could occupy 99% of the sample area and a second sample region could occupy 1% of the sample area. The first sample region in this example could be a substrate material and the second sample region could be a sample material. Sample region 54 is arranged on a regular grid 55A within sample area 11 that logically extends to regular grid 55B within sample area 11C. That is the set of sample regions spans the sample areas. In other embodiments, the sample regions may be irregularly shaped as shown by irregular shaped sample region 56. An irregular shaped sample region may be defined by the shape of sample material 22 as shown at 57. The sample regions may be discontinuous, consisting of two or more non-connected areas as shown at 58A and 58B. A discontinuous sample region as illustrated at 58A and 58B may for example correspond to an area occupied by a type of sample material with spatial boundaries following the contour of the sample material. The sample material may for example be a cell or a group of identical non-connected cells. User defined sample regions have three advantages. Firstly, the user defined sample region may interact with a larger flux of radiation than a region defined by a regular grid and the larger flux of radiation results in improved signal-to-noise. Secondly, the user defined sample region boundaries may be selected to minimize spectral interferences, thereby improving the specificity of the measurement. Thirdly, the number of user selected sample regions may be less than the number of sample regions in a regular grid. This reduces the complexity of the inverse problem (relating detector amplitudes to sample region interactions as discussed in relation to equation 1 below) and the computational resources required to solve the inverse problem.

The amplitude measured at each detector region of detector 29 is a function of the material properties at each sample point intersected by rays propagating from the radiation source to that detector region. Formally, $$A_i(\lambda) = \Sigma A_k(\lambda) \int \int F(u_j, v_j, \lambda) G_k(u_j, v_j, \lambda) du_j \, dv_j \quad (1)$$

Where $A_i(\lambda)$ is the amplitude at the $i^{th}$ detector region for wavelength $\lambda$, $A_k(\lambda)$ is the amplitude of each ray at the radiation source for each wavelength and $u_j$ and $v_j$ are spatial coordinates of the $j^{th}$ sample area. $F(u_j,v_j,\lambda)$ represents sample absorbance as a function of space and wavelength and $G_k(u_j,v_j,\lambda)$ is the spatial distribution of radiation amplitude associated with each ray for each wavelength. $G_k(u_j, v_j,\lambda)$ can be measured directly in a calibration step, for example by measuring the response from a sample material with known (and preferably spatially invariant properties) such as a mirror. $G_k(u_j,v_j,\lambda)$ may also be modeled with varying degrees of sophistication ranging from geometric optics ray tracing to physical optics to a full Maxwell equation model.

The ultimate objective of the invention is to determine $F(u_j,v_j,\lambda)$. Three main approaches can be taken. Firstly, equation 1 can be approximated as a matrix equation and $F(u_j,v_j,\lambda)$ can be determined by solving a linear system of equations. Secondly, $F(u_j,v_j,\lambda)$ can be determined with a neural network algorithm. Thirdly, $F(u_j,v_j,\lambda)$ can be determined with an iterative algorithm wherein an approximate spatial distribution of sample material (and corresponding $F(u_j,v_j,\lambda)$ is modeled) the resulting $A_i(\lambda)$ for that model is calculated, and the squared difference between model and measured values of $A_i(\lambda)$ is minimized by iteratively adjusting $F(u_j,v_j,\lambda)$. This second approach works best if the starting approximation is close to the final solution. The starting approximation may for example be provided by a solution to the matrix equation or the neural network algorithm.

If $G_k(u_j,v_j,\lambda)$ is approximately constant over a sample area or at least a region of a sample area, Equation 1 may be simplified to a matrix equation $$d = Ms \quad (2)$$

where s is a vector of sample sub-region amplitudes, d is a vector of detector amplitudes, and M is a matrix of coefficients describing the contribution of each sample sub-region to the amplitude received at each detector sub-region. For example, for each ray arriving at a detector sub-region, the amplitude of that ray is added to the column representing each sample sub region the ray passed through. The matrix equation may be solved by inversion ($s=M^{-1}d$) or by least squares methods.

FIG. 4 shows a schematic view of the arrangement according to the present invention with multiple probe beams. There are m radiation sources labeled B1 through Bm in the column indicated at 91 where m is an integer greater than 1 and less than the number of sample regions N. Each radiation source is in communication with control 90 as indicated at 92. Each radiation source is associated with a set of three-dimensional ray paths Ti as indicated at 93 where the index i indicates the radiation source and the bold text indicates that Ti is a matrix wherein each ray path in the radiation beam is a row and each column represents a coordinate along a ray path. The number of interactions with the sample area and hence number of coordinates included in each matrix Ti varies. As indicated at 93 there are Ni sample area interactions, where i is the index of the radiation source. A ray path may cross the same sample region more than once from different directions. Each path includes a different set of sample regions numbered from 1 to Ni. Each sample region is included in at least one ray path. Different ray paths may include the same sample region, provided that there is at least one sample region in a first path that is not included in a second path. The paths may each include a different number of sample regions. In the special case wherein the sum of sample regions included in each path is equal to the number of sample regions, the arrangement is analogous to the arrangement in the above cited HEMS patent, except that amplitude at each sample region is modified by interaction with sample material rather than conserved. In the more general case, the sum of sample regions included in all ray paths is greater than the number of sample regions N.

While in principle the number of ray paths in a beam approximates the number of photons, in practice a smaller number of ray paths may be used for numerical simulation. For example, the number of ray paths for a numerical simulation may be in the range from 10,000 to 1,000,000. Control 90 is operable on beam sources to change the shape, amplitude, and spectral content of each beam. For example, the output beam may be shaped to compensate for the angle of incidence on a sample area. In this case a cylindrical lens or mirror may shape the beam to an ellipse cross-section such that the projection on a sample area is circular. For example, the beam amplitude may be temporally modulated. The temporal modulation may for example be performed with an interferometer wherein phase modulation is used to encode wavelength. The temporal modulation may include a temporal sequence of wavelengths. In these cases temporal modulation is applied uniformly across the beam cross section. The probe beam may be spatially modulated wherein by a spatial modulator integral to or immediately after the probe beam source. In some embodiments, the spatial pattern is magnified with focusing optics by a factor of less than one to produce a scaled spatially modulated probe beam at a sample location. This feature may be used for example to selectively illuminate sample regions for calibration.

Figure 7:
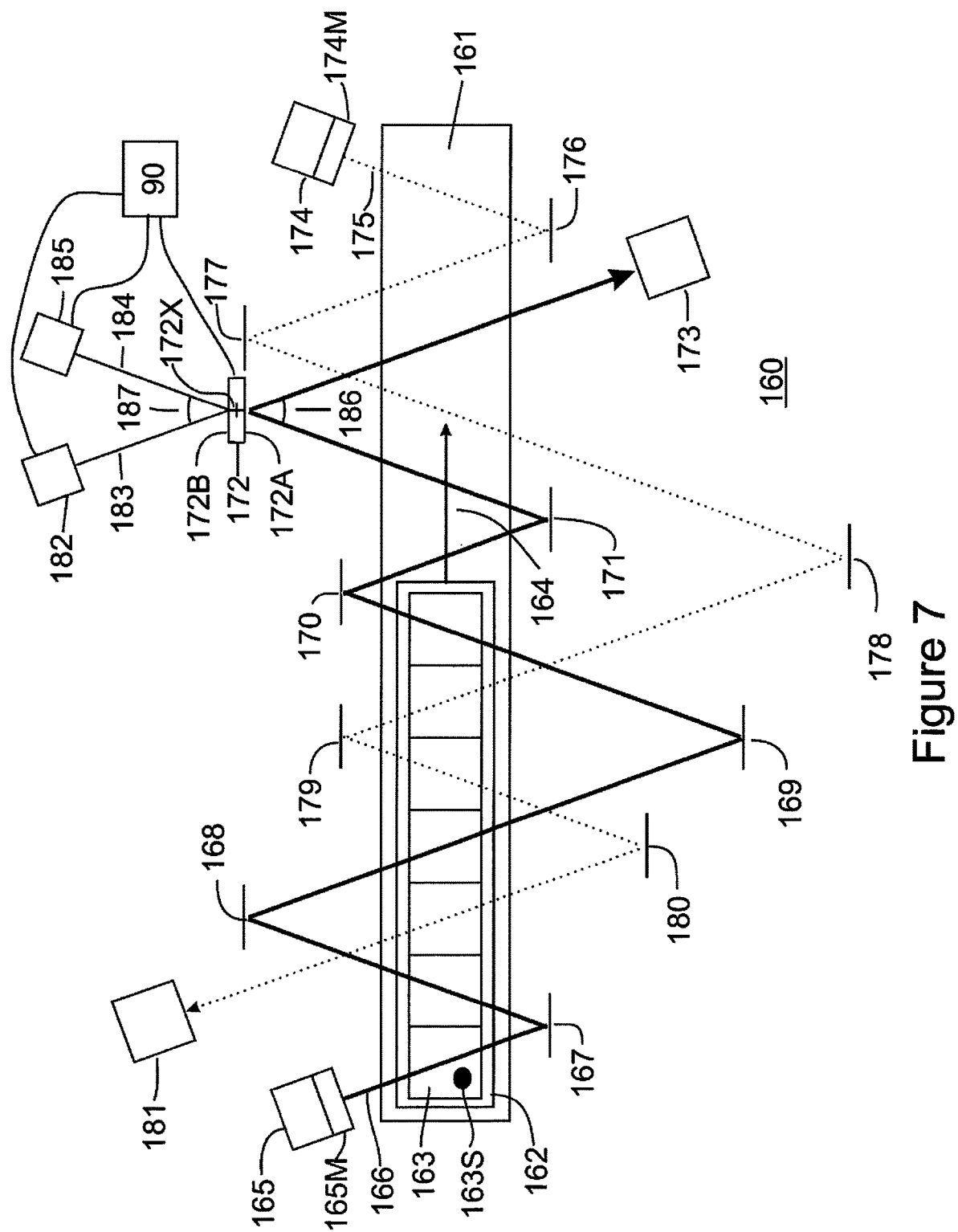
FIG. 7 shows top view of an arrangement according to the present invention for measuring spectra of a sequence of sample areas.

As shown at 95, radiation source Bi directs radiation represented by set of rays Ti incident on a first set of sample regions Si1. Radiation interacts with sample regions Si1 and is collected by optical elements Ei1 as shown at 96 and also indicated at 38 in FIG. 2D. Optical elements Ei1 direct radiation incident on a second set of sample regions Si2 as shown at 97. The sequence of radiation incident on a sample region and then optical elements is repeated a total of Ni times. The number of sample interactions N1, N2 and Nm for paths 1, 2, and m respectively may be different. In some embodiments the sample regions along each path are selected according to a pseudo-random sequence as best shown in FIG. 7. In FIG. 7, the pseudo-random sequence {1,1,0,1,0,0,1} is illustrated wherein sample regions at the ordinal position of a "1" are included in a first ray path and sample regions at the ordinal position of a "0" are included in a second ray path. In this example N1=4 and N2=3. As shown at 98, the sample regions Sij may optionally be in communication with the control 90 which controls external acoustic and electromagnetic fields at the sample regions as described in detail in the above cited MDS patent. Briefly, control 90 sends signals that cause external fields to be imposed on the sample regions which in turn cause periodic distortion of sample molecule configurations and hence spectral changes. In embodiments that include the arrangement of the MDS patent in combination with features of the present disclosure, the arrangement of the MDS patent increases the number of spectral features that can be measured and features of the present disclosure enhance the signal-to-noise ratio of those spectral features. The combined arrangement may be used for example to measure multi-dimensional spectra of a virus such as SARS-CoV2 wherein the present disclosure improves the sensitivity of the measurement and the arrangement described in the MDS patent improves the specificity of virus identification.

As shown at 99, control 90 is optionally in communication with optical elements Eij and operable to change the configuration of said optical elements where the index i specifies the radiation source and the index j specifies the set of sample regions said optical elements receives radiation from. In some embodiments the optical elements have a constant configuration. For example, the optical elements may be surfaces of an internal reflection crystal. In some embodiments, the optical elements have a configuration selected from a plurality of configurations by control 90. For example, a mirror may be moved from a first position to a second position wherein the first position directs radiation to a first set of sample regions and the second position directs radiation to a second set of sample positions. In some embodiments, the optical elements have a constant configuration and are translated or rotated from a first position to a second position relative to a sample area or set of sample areas. A first set of sample regions is selected in the first position and a second set of sample regions is selected in the second position. The optical elements are any combination of mirrors, lenses, gratings or other that operate to change a property of radiation wherein the property is selected from direction, phase, polarization, or amplitude.

As shown at 89, there are m detectors numbered from 1 to m in communication with control 90. In some embodiments the detectors are physical arrays with a plurality of transducers that convert radiation amplitudes to electrical signals. In some embodiments the detectors are virtual arrays wherein a single detector is move to a plurality of positions. In some embodiments the detector is a single transducer.

Figures 5A, 5B:
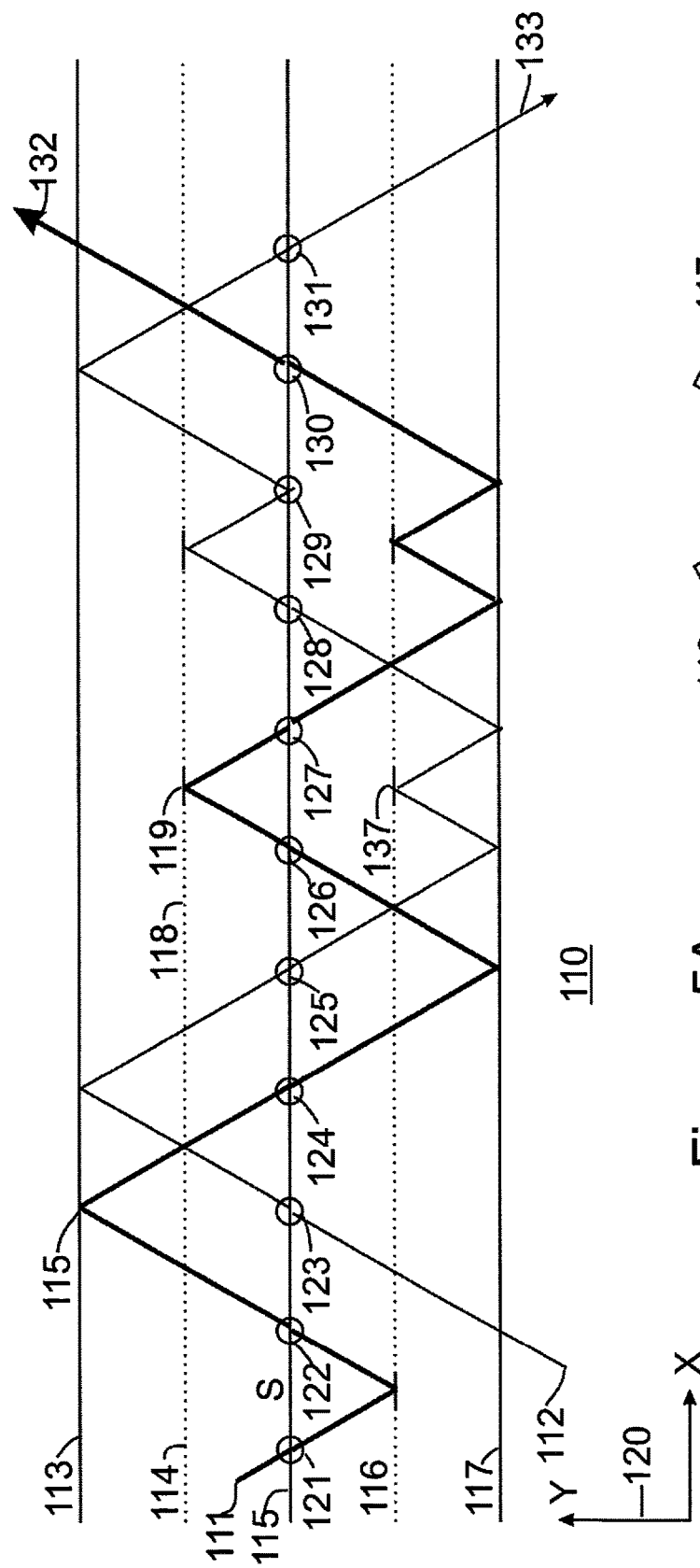
FIG. 5A shows a schematic view of a multiplex arrangement of the present invention.
FIG. 5B shows a cross-sectional view of the arrangement in FIG. 5A.

FIG. 5A shows a schematic view of a multiplex arrangement of the invention generally indicated at 110. The arrangement comprises 11 sample areas equally spaced along row 115 in the x-direction given by coordinate frame 120. The sample areas are indicated at 121, 122, 123, 124, 125, 126, 127, 128, 129, 130, and 131. As best seen in FIG. 5B generally indicated at 140, two layers of mirrors are arranged symmetrically about the z-axis indicated at 136 on either side of the line of samples 115. The mirrors in the first layer indicated at 114 and 116 in FIG. 5A have two configurations. In the first configuration indicated at 114T mirror 114 is rotated out of the path of beam 134 by actuator (not shown) in communication with control 90 allowing a radiation beam to pass from sample line 115 to mirror 113 or vice versa. Similarly mirror 116 may be rotated to configuration 116T by actuator (not shown) in communication with control 90 allowing radiation beam 135 to pass from sample line 115 to mirror 117 or vice versa. The first configuration is indicated with a dashed line in FIG. 5A as indicated at 118. In the second configuration indicated at 114R and 116R in FIG. 5B, mirrors 114 and 116 are rotated to reflect incident radiation toward the sample line 115. Mirrors 113, 114R, 116R and 117 are oriented at the same angle relative to the z-axis.

As shown in FIG. 5A, first incident radiation beam 111 is incident on sample area 121 and is reflected to mirror of type 116R and is returned to the next sample location 122. The angle of incidence of radiation beam 111 is selected such that a reflection from a mirror along the line 114 or 116 advances one sample position and a reflection from a mirror along the line 113 or 117 advances two sample positions. The scheme is easily extended to advance 3 or more sample positions per reflection by reflection between lines 113 and 114 or between lines 116 and 117 as shown at 137. All that is required is that the mirrors 114R and 116R are reflective on both sides. Hence, by this scheme radiation beam 111 is incident on sample areas 121, 122, 124, 126, 127, and 130 in succession. The pattern of sample areas is the first code sequence 11010110010. Radiation beam 111 is measured by a detector at 132. A second radiation beam 112 is incident on sample areas 123, 125, 128, 129, and 131 and is measured by a detector at 133. The pattern of sample areas for the second beam 112 is the code sequence 00101001101. For the example given in FIG. 5A N1=6, N2=5, and N=11 for the scheme given in FIG. 4. By moving mirrors along the lines 114 and 116 between transmit and reflect positions, the apparatus can be configured to produce cyclic permutations of the code sequences. The cyclic permutations and associated amplitude measurements of one code sequence are readily recognized as a quasi-Hadamard case and the absorbance of each sample area is obtained by inversion of the matrix of code sequences. In the case beams 111 and 112 are measured, the absorbance of each sample area is obtained as described in full detail in the above cited HEMS patent. Specifically, in the example given there are 11 cyclic permutations of the mirrors and each of two detectors make 11 measurements to produce a data vector y of length 22. The Z matrix described in the HEMS patent has 11 columns, one for each sample position and 22 rows, 11 for each cyclic permutation of the pseudo-random sequence (beam 111) and 11 for the compliment of each cyclic permutation (beam 112). From Equation 3 in the HEMS patent, the vector of absorbance b is given by $b=(Z^TZ)^-Z^Ty$. The foregoing works in the case that the samples at each sample area are homogenous. In the inhomogeneous case, the sample areas are divided into Q sample regions and rays are traced from source to detector and equation 1 is solved for sample region absorbance as discussed previously.

FIGS. 6A, 6B and 6C show cross-sectional views of beam paths with different angles of incidence on the sample area 142. The beam paths illustrated in FIGS. 6A, 6B and 6C are sections through the y-z plane as indicated by the coordinate system at 141. Incident radiation beam has a direction vector with a component in the x-direction perpendicular to the figures.

In FIG. 6A reflective surfaces are indicated at 142, 143A, 143B, 144, 145A, 145B and 146. Sample material is placed at sample areas 142. Radiation travels along the paths 152 and 153 or sections thereof between reflective surfaces in a sequence. An infinite number of paths along the x-axis are possible, so only an illustrative example is given. Note that for each successive step in the example given, the coordinate in the x-direction is increased. For example, radiation may be incident on sample area 142 and be reflected along path 152 to reflective surface 144. At reflective surface 144 radiation is reflected to reflective surface 143B and then to reflective surface 144. From reflective surface 144 radiation is reflected to sample area 142. At sample area 142 radiation is reflected onto path 153 and is incident on reflective surface 145A. Reflective surface 145A reflects radiation to sample area 142 where it is reflected to reflective surface 143A. Reflective surface 143A reflects radiation to sample area 142 where radiation is reflected along path 153 to reflective surface 146. At reflective surface 146, radiation is reflected by reflective surface 145B back to reflective surface 146. Radiation is finally reflected from reflective surface 146 to sample area 142.

In FIG. 6B reflective surfaces are indicated at 142, 147A, 147B, and 148. An infinite number of paths along the x-axis are possible, so only an illustrative example is given. Radiation incident on sample area 142 is reflected on path 154 to reflective surface 148. Radiation is reflected from reflective surface 148 to reflective surface 147B and back to reflective surface 148 from whence it is reflected to sample area 142. Radiation reflected from sample area 142 is reflected to reflective surface 147A and from reflective surface 147A back to sample area 142.

In FIG. 6C reflective surfaces are indicated at 142, 149A, 149B, 150, 151A, 151B, and 152. Like FIG. 6A, an infinite number of paths along the x-axis are possible and the description of an example path is similar to the example given for FIG. 6A. In the description for FIG. 6A replace reflective surfaces 143A, 143B, 145A, 145B, 144 and 146 with reflective surfaces 149A, 149B, 151A, 151B, 150 and 152, respectively. Replace paths 152 and 153 with paths 155 and 156, respectively.

For each figure individually, radiation beams are incident on sample area 142 at different displacements along the x-axis as shown for example in FIG. 5A. The patterns in FIGS. 6A, 6B, and 6C may be combined so that a beam is incident on the same sample area a plurality of times with different angles of incidence. For example, a radiation beam may be incident on a sequence of sample areas along the x-axis according to the pattern in FIG. 6A. At the end of the sequence for FIG. 6A, optical elements reflect the radiation beam to transverse the x-axis in the opposite direction according to the pattern in FIG. 6B incident on the same sequence of sample areas in reverse order. At the end of the sequence for FIG. 6B, optical elements reflect the radiation beam to transverse the x-axis in the opposite direction according to the pattern in FIG. 6C incident on the same sequence of sample areas. In this illustrative example, the sample interaction at each sample area is increased by a factor of 3. The concept herein is easily extended by adding pairs of reflective elements at angles of incidence different from those shown.

FIG. 7 shows a top view of an arrangement for measuring spectra of a sequence of sample areas generally indicated at 160. An ordered sequence of sample areas 163 are carried on movable platform 162 that moves from left to right in the diagram as indicated at 164 over reflective surface 161. In some embodiments (not shown) movable platform 162 is integral with reflective surface 161. Vertically displaced reflective surfaces are placed on either side of reflective surface 161 as shown in FIG. 5B or in FIGS. 6A, 6B and 6C. Sample areas 163 contain sample material 163S. The sample material 163S may for example be a biological sample that contains cells, bacteria, viruses, biological fluids, biopolymers or any combination thereof. A first probe radiation beam 166 is emitted from source 165. First probe beam 166 may optionally be modulated by modulator 165M integral to source 165. Probe beam 166 is reflected in sequence by reflective surfaces 167, 168, 169, 170, 171, and 172 before being received and analyzed by detector 173. A second probe radiation beam 175 is emitted from source 174. Second probe beam 175 may optionally be modulated by modulator 174M integral to source 174. Probe beam 175 is reflected in sequence by reflective surfaces 176, 177, 178, 179, and 180 before being received and analyzed by detector 181. Each time radiation beam 166 crosses reflective surface 161, probe radiation beam 166 either interacts with and is reflected by a sample area if said sample area overlays reflective surface 161, or is reflected by reflective surface 161. Each time radiation beam 175 crosses reflective surface 161, probe radiation beam 175 either interacts with and is reflected by a sample area if said sample area overlays reflective surface 161, or is reflected by reflective surface 161. In both cases the pattern of sample interactions and surface reflections forms a coded sequence of 1's (sample interaction) and 0's (surface reflection). Reflective surfaces 167, 168, 169, 170, 171, and 172 are arranged such that translating movable platform 162 by the length of one sample area gives a cyclic permutation of a first coded sequence. Reflective surfaces 176, 177, 178, 179, and 180 are arranged such that translating movable platform 162 by the length of one sample area gives a cyclic permutation of a second coded sequence. The second coded sequence is the compliment of the first coded sequence. In the example shown, the code sequence has length 7. Other, preferably longer pseudo-random code sequences may be used. The minimum code sequence length in this arrangement is 3.

The arrangement of FIG. 7 may be reconfigured by control 90 to change the code sequences. Each reflective surface may be reoriented as shown in detail for optical element 172. Optical element 172 has two reflective surfaces 172A and 172B and is rotated about axis 172X by an actuator (not shown) in communication with control 90. The angle between reflective surfaces 172A and 172B is fixed. Calibration beam source 182 in communication with control 90 generates calibration beam 183 incident on reflective surface 172B. The reflected calibration beam 184 is measured by position sensitive detector 185 in communication with control 90. The angular displacement of reflective surface 172S is adjusted by control 90 until the angular displacement of calibration beam 184 corresponds with the required angular displacement of reflective surface 172A for a code configuration. The angular displacement of reflective surface 172A is related to the measured angular displacement of reflective surface 172B by a constant angle. As shown reflective surfaces 172A and 172S are parallel, but the method will work with any known constant angle. In some embodiments reflective surfaces may be the same surface. The calibration beam source 182 may for example be a laser. The angular calibration of reflective surface 172A may be dynamically adjusted to compensate for misalignment for example caused by vibration. Alternately, reflective surface 172A may be aligned for a desired configuration and then locked in position.

To measure the spectra of each sample area, spectra are measured for each position of the movable platform in the code sequence. That is spectra are measured at both detectors and the platform is advanced by the length of one sample area. The process is repeated until the number of measurements at each detector is equal to the length of the code sequence. The spectra so measured are combinations of the spectra of each sample area. The spectrum of each sample area is obtained by methods described in the above cited HEMS patent. The same general method can be applied to sample regions within the sample areas with modification. In general, there are groups of sample regions from different sample areas that form closed sets along a ray path or group of proximate ray paths. The modification is that the sample regions assigned to each detector region are selected by ray tracing.

While the arrangement of the present invention reduces the dynamic range of measured optical amplitudes by summing absorption from different sample locations, some ray paths may include only low absorption sample regions. In this case it may be advantageous to reduce the probe radiation amplitude along such low absorption ray paths with a spatial modulator to limit the dynamic range of amplitudes at the detection means. Alternately, it may be advantageous to increase the probe radiation amplitude along ray paths that intersect sample regions containing strongly absorbing sample material. Control 90 may adjust the initial amplitude of probe radiation along each ray path by sending appropriate control signals to modulators 165M and 174M.

The signal-to-noise ratio for each sample area spectrum depends in part upon the bit resolution of measured ray path amplitudes, or equivalently the smallest amplitude difference measurable. In operation the arrangement of FIG. 7 may measure spectra of sample areas a first time using a detector amplification factor that includes all possible measured ray path amplitudes. Control 90 analyzes the first set of measured ray path amplitudes and selects ray paths with measured amplitudes that differ from the average ray path amplitude by more than a threshold value. Control 90 generates and transmits signals to modulators 165M and 174M causing modulators 165M and 174M to adjust the initial amplitudes of probe radiation along the selected ray paths wherein the adjustment is such that the measured amplitudes for the selected ray paths is closer to the average amplitude measured for all ray paths. Control 90 then maps the dynamic range of detectors 173 and 181 onto the (now smaller) expected range of ray path amplitudes. Control 90 next causes a second set of measurements to be made producing a second set of sample region spectra with improved signal-to-noise ratios.

The invention claimed is:

1. A method for analyzing an optically thin sample for presence of a target material comprising:
    locating the optically thin sample which potentially contains the target material;
    the sample including a plurality of sample locations each containing an unknown sample material, a known sample material, or no sample;
    propagating a non-collimated beam of probe electromagnetic radiation from a beam source so that rays within the beam are directed along a plurality of different ray paths;
    wherein each ray path is a parameterized path comprising a plurality of ray path segments in different directions;
    directing each ray using optical elements so that each ray path intersects upon the sample a plurality of times at a plurality of different intersection locations;
    at each of the plurality of interaction locations causing the rays to interact with the sample material to cause a modification of the ray;
    after intersecting sample locations directing each ray path to intersect a detection surface where the detection surface is divided into a plurality of detection spatial regions;
    measuring separately the rays received at each detection spatial region where the measurements contain information about the interaction of sample materials along the ray paths at each interaction location;
    and analyzing the measurements to provide information about at least one property of sample material at each interaction location;
    wherein an analysis is carried out to trace the paths of a set of rays that statistically represent properties of the probe beam radiation from a location at the probe beam source to said detection spatial region on the detection surface so as to identify the interaction locations so as to provide information about said at least one property of said target material at each interaction location;

wherein the probe beam properties include at least two properties selected from the set of amplitude, direction, wavelength, phase and polarization.

2. The method according to claim 1 wherein the analysis solves the inverse problem of relating the amplitudes measured at points on the detector surface to amplitudes at the identified interaction locations.

3. The method according to claim 2 wherein the inverse problem is solved by modelling the sample point amplitudes as a linear combination of detector point amplitudes with coefficients to be determined where a first trial set of coefficients is generated and varied iteratively to minimize the difference between the ray trace simulation and the measured detector point amplitudes.

4. The method according to claim 2 wherein the inverse problem is solved by a neural network which is trained to model the relationships between sample regions and detector outputs.

5. The method according to claim 2 wherein the inverse problem is solved by defining a set of sample regions and a set of detector regions and to bin all rays that fall within the respective regions together which leads to a set of linear equations that can be solved to provide an inverse transformation.

6. The method according to claim 1 wherein the beam is convergent or divergent to provide magnification of the sample at the detection locations.

7. The method according to claim 1 wherein after at least one of the interactions the beam is focused.

8. The method according to claim 1 wherein at least one of the sample locations has a shape different from a respective one of the detection locations.

9. The method according to claim 1 wherein at least one of the sample locations is defined by at least one curvilinear line.

10. The method according to claim 1 wherein at least one of the sample locations is defined by user selection.

11. The method according to claim 1 wherein the ray tracing is used to generate a different sequence of rays crossing each sample location.

12. The method according to claim 1 wherein the flux of rays or number of crossings at a sample location can be dynamically adjusted according to a property of the sample location.

13. The method according to claim 1 wherein at least one ray crosses a pseudo random sequence of sample locations.

14. The method according to claim 1 wherein multiple beams cross different sequences of sample locations so that there is at least one different location in any two sequences.

15. The method according to claim 1 wherein the optical layout changes dynamically to provide different sequences of sample location crossings.

16. The method according to claim 15 wherein the dynamic optical layout provides a spatial encoder.

17. The method according to claim 1 wherein at least one beam source further includes a spatial modulator.

18. The method according to claim 1 wherein the rays are directed by the optical components so as to intersect at least one of the sample locations at a plurality of different angles of incidence.

19. The method according to claim 1 wherein at least one of the sample locations is discontinuous.

20. The method according to claim 1 wherein at least one of the sample locations includes a plurality of different spots.

21. The method according to claim 1 wherein the optical elements are dynamically aligned such that the position of a laser beam on a detector reflected off a surface of the optical element corresponds with a desired location within a threshold value.

22. The method according to claim 1 wherein the number of times a ray crosses sample locations is varied to provide variable amplification.

23. The method according to claim 1 wherein the optical elements have a plurality of different configurations.

24. The method according to claim 1 wherein each configuration of optical elements has a corresponding set of ray paths.

25. The method according to claim 1 wherein the ray tracing is carried out by a ray tracing model where the probe beam is modeled as a set of rays that statistically reflect the properties of the probe radiation beam and where each ray has an origin location on the radiation source output port and each ray is propagated through the optical system to the intersection with the detector surface and each point of intersection with sample material or an optical element is stored.

26. The method of claim 1 wherein the ray tracing is carried out by modeling the flow of energy by Maxwell's Equations and the direction of each ray at a location corresponds to the direction of the Poynting vector at that location.

27. The method according to claim 1 wherein sample materials are positioned on a reflective plane surface and a plurality of reflective surfaces are arranged above the plane of sample materials to reflect at least one beam of probe radiation which is incident upon, and interacts with the sample materials a plurality of times.

28. The method according to claim 1 wherein the sample materials are positioned on a transparent substrate and a plurality of reflective surfaces are arranged above and below the plane of sample materials reflect at least one beam of probe radiation incident upon and interacts with the sample materials a plurality of times.

29. The method according to claim 1 wherein at least a portion of a non-collimated beam of probe radiation is incident on the same sample area plurality of times at the same average angle of incidence interacting with at least one sample region a plurality of times and the spatial distribution of amplitudes in the probe beam after said interaction is analyzed to provide information about the spatial distribution of interactions with the sample material.

30. The method according to claim 1 wherein the set of sample areas included in at least one probe radiation path is changed at least in part based on a measured sample parameter.

31. A method for analyzing an optically thin sample for presence of a target material comprising:
locating the optically thin sample which potentially contains the target material;
the sample including a plurality of sample locations each containing an unknown sample material, a known sample material, or no sample;
propagating a beam of probe electromagnetic radiation from a beam source so that rays within the beam are directed along a plurality of different ray paths;
wherein each ray path is a parameterized path comprising a plurality of ray path segments in different directions;
directing each ray using optical elements so that each ray path intersects upon the sample a plurality of times at a plurality of different intersection locations;

wherein the rays are directed by the optical elements so as to intersect the sample at a plurality of different angles of incidence;

at each of the plurality of interaction locations causing the rays to interact with the sample material to cause a modification of the ray;

after intersecting sample locations directing each ray path to intersect a detection surface where the detection surface is divided into a plurality of detection spatial regions;

measuring separately the rays received at each detection spatial region where the measurements contain information about the interaction of sample materials along the ray paths at each interaction location;

and analyzing the measurements to provide information about at least one property of sample material at each interaction location;

wherein an analysis is carried out to trace the paths of a set of rays that statistically represent properties of the probe beam radiation from a location at the probe beam source to said detection spatial region on the detection surface so as to identify the interaction locations so as to provide information about said at least one property of said target material at each interaction location;

wherein the probe beam properties include at least two properties selected from the set of amplitude, direction, wavelength, phase and polarization.

32. A method for analyzing an optically thin sample for presence of a target material comprising:

locating the optically thin sample which potentially contains the target material;

the sample including a plurality of sample locations each containing an unknown sample material, a known sample material, or no sample;

propagating a beam of probe electromagnetic radiation from a beam source so that rays within the beam are directed along a plurality of different ray paths;

wherein each ray path is a parameterized path comprising a plurality of ray path segments in different directions;

directing each ray using optical elements so that each ray path intersects upon the sample a plurality of times at a plurality of different intersection locations;

wherein rays in the beam are convergent or divergent to provide magnification of the sample at the intersection locations;

at each of the plurality of interaction locations causing the rays to interact with the sample material to cause a modification of the ray;

after intersecting sample locations directing each ray path to intersect a detection surface where the detection surface is divided into a plurality of detection spatial regions;

measuring separately the rays received at each detection spatial region where the measurements contain information about the interaction of sample materials along the ray paths at each interaction location;

and analyzing the measurements to provide information about at least one property of sample material at each interaction location;

wherein an analysis is carried out to trace the paths of a set of rays that statistically represent properties of the probe beam radiation from a location at the probe beam source to said detection spatial region on the detection surface so as to identify the interaction locations so as to provide information about said at least one property of said target material at each interaction location;

wherein the probe beam properties include at least two properties selected from the set of amplitude, direction, wavelength, phase and polarization.

33. A method for analyzing an optically thin sample for presence of a target material comprising:

locating the optically thin sample which potentially contains the target material;

the sample including a plurality of sample locations each containing an unknown sample material, a known sample material, or no sample;

propagating a beam of probe electromagnetic radiation from a beam source so that rays within the beam are directed along a plurality of different ray paths;

wherein each ray path is a parameterized path comprising a plurality of ray path segments in different directions;

directing each ray using optical elements so that each ray path intersects upon the sample a plurality of times at a plurality of different intersection locations;

wherein at least one ray crosses a pseudo random sequence of sample locations;

at each of the plurality of interaction locations causing the rays to interact with the sample material to cause a modification of the ray;

after intersecting sample locations directing each ray path to intersect a detection surface where the detection surface is divided into a plurality of detection spatial regions;

measuring separately the rays received at each detection spatial region where the measurements contain information about the interaction of sample materials along the ray paths at each interaction location;

and analyzing the measurements to provide information about at least one property of sample material at each interaction location;

wherein an analysis is carried out to trace the paths of a set of rays that statistically represent properties of the probe beam radiation from a location at the probe beam source to said detection spatial region on the detection surface so as to identify the interaction locations so as to provide information about said at least one property of said target material at each interaction location;

wherein the probe beam properties include at least two properties selected from the set of amplitude, direction, wavelength, phase and polarization.

* * * * *